United States Patent [19]

Kobayashi et al.

[11] 4,443,852
[45] Apr. 17, 1984

[54] CONTROL APPARATUS FOR INTERNAL COMBUSTION ENGINE

[75] Inventors: Masayoshi Kobayashi, Kawagoe; Hidekazu Oshizawa, Kumagaya; Kenji Okamoto, Higashimatsuyama; Akira Sekiguchi, Saitama, all of Japan

[73] Assignee: Diesel Kiki Co., Ltd., Tokyo, Japan

[21] Appl. No.: 209,967

[22] Filed: Nov. 24, 1980

[30] Foreign Application Priority Data

Nov. 29, 1979 [JP] Japan .................. 54-165354[U]

[51] Int. Cl.³ .................. G05D 13/62; F02B 3/00; B60K 41/08
[52] U.S. Cl. .................. 364/431.03; 74/866; 123/350; 123/357; 364/424.1
[58] Field of Search .................. 123/357; 74/866; 60/347; 364/424.1

[56] References Cited

U.S. PATENT DOCUMENTS

| | | | |
|---|---|---|---|
| 3,448,640 | 6/1969 | Nelson | 74/866 |
| 3,757,750 | 9/1973 | Ohtani | 123/357 |
| 3,835,819 | 9/1974 | Anderson | 364/442 |
| 3,906,207 | 9/1975 | Rivere et al. | 364/425 |
| 3,969,614 | 7/1976 | Moyer et al. | 364/431.06 |
| 3,973,538 | 8/1976 | Williams et al. | 123/357 |
| 3,981,287 | 9/1976 | Williams et al. | 123/357 X |
| 4,034,627 | 7/1977 | Mizote | 74/866 |
| 4,274,306 | 6/1981 | Yokoi et al. | 74/866 |
| 4,294,211 | 10/1981 | Stumpp et al. | 123/357 |

Primary Examiner—Felix D. Gruber
Attorney, Agent, or Firm—Guy W. Shoup; Gerard F. Dunne

[57] ABSTRACT

A control signal which corresponds to an actual operating condition of the engine is determined on the basis of the design specifications irrespective of an actual operation amount of an operating member of the fuel injection apparatus. The result of the determination is provided for controlling a coupled apparatus which is equipped with the engine.

7 Claims, 4 Drawing Figures

CONTROL APPARATUS FOR INTERNAL COMBUSTION ENGINE

This invention relates to a fuel injection apparatus for an internal combustion engine, and more particularly to a fuel injection apparatus having a control system which is capable of enhancing control accuracy.

One of the problems involved in a conventional fuel injection apparatus for internal combustion engines is that the relationship between the actual position of an operating member for the fuel injection apparatus and the corresponding operation condition of the engine equipped with the fuel injection apparatus does not always correspond with the relationship intended in the design specifications. This is mainly due to deviation from design specifications in dimensions, weights, and other characteristics of the mechanisms and components of the individual fuel injection apparatuses. For example, even in two fuel injection apparatuses of the same type, variations in the spring force of the governor mechanisms or in the weight or dimension of flyweights will cause a difference in the relationship between the actual position of a control lever and the actual fuel injection amount. From this it follows that when such fuel injection apparatus are used in diesel engines, the characteristics of each such apparatus will differ from those of other apparatus as regards the relationship between the actual position of the control lever and the actual engine speed even under identical engine load conditions.

Fuel injection apparatus are commonly employed in internal combustion engines equipped with torque converters. In such cases, the speed-changing or gear-shifting timing of the torque converter is often determined on the basis of the position of the accelerator pedal, which also has a bearing on the position of the control lever of the fuel injection apparatus and the rotational speed of the engine under a given load, and thus the speed changing or gear-shifting operation is not always carried out within the predetermined timing if the relationship between the position of the control lever and the rotational speed deviates from that intended by the design specifications. Therefore, the speed changing operation is sometimes effected only after the rotation speed becomes too high relative to the degree of depression of the accelerator pedal and is sometimes effected under a condition of insufficient torque. Thus, there has been the problem that the desired performance of the torque converter cannot always be obtained.

For similar reasons, it has been difficult to provide a control device for maintaining the speed of vehicles at desired speed.

It is therefore an object of the present invention to provide a fuel injection apparatus which is capable of properly and exactly controlling an apparatus with which it is coupled.

It is another object of the present invention to control an apparatus coupled to an engine and designed to be operated in response to the position of an operating member for the fuel injection apparatus on the basis of the actual operating condition of the engine and the fuel injection apparatus.

In accordance with the present invention, the theoretical position of an operating member for the fuel injection apparatus which corresponds to the actual operating condition of the engine is determined on the basis of design specifications. The result of this determination is provided for controlling a coupled apparatus such as a torque converter with which the engine is equipped.

In a preferred embodiment, the invention is applied to a diesel engine apparatus for a vehicle having a torque converter coupled with the engine. The torque converter, an apparatus coupled with the engine, is of the type adapted to be controlled by an electrical signal corresponding to with the degree of depression of an accelerator pedal. To control the torque converter accurately according to the actual operating condition of the engine, the signal applied to the torque converter is determined on the basis of a rotation signal indicative of the rotational speed of the engine, an injection-amount signal indicative of the injection amount from an injection pump, and data on the design specifications (design data).

Therefore, even if the actual degree of depression of the accelerator pedal and the operating condition of the engine are not in the relationship intended by the design data because of deviation from standards due to characteristics of the fuel injection apparatus employed, the torque converter coupled to the engine can be controlled by a signal obtained through an electronic determination so as to operate in an ideal condition in accordance with the condition of the mechanical output from the engine.

These and other objects and features of this invention will be better understood upon consideration of the following detailed description and the accompanying drawings in which.

Figure 1:
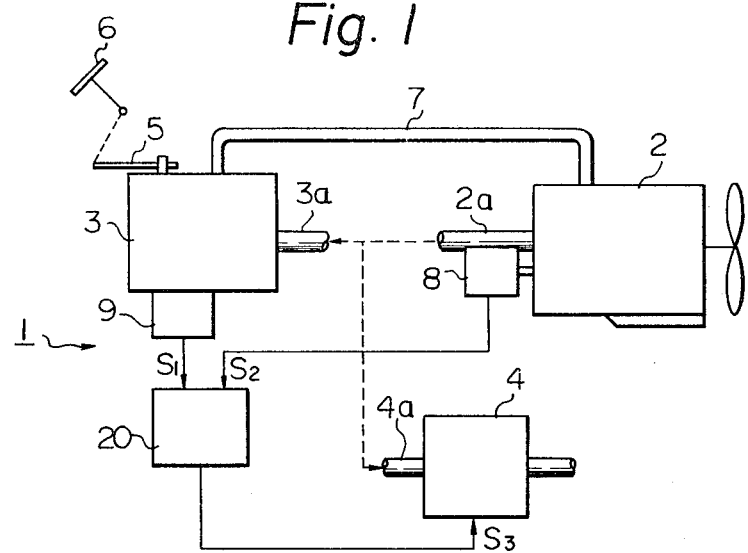
FIG. 1 is a block diagram of a diesel engine apparatus for a vehicle which is equipped with a fuel injection apparatus of the present invention.

Referring to FIG. 1, there is diagrammatically illustrated an internal combustion engine system equipped with a fuel injection apparatus 1 in accordance with the present invention. This internal combustion engine system includes a diesel engine 2, a fuel injection pump 3 for feeding fuel to the diesel engine 2, and a conventional torque converter 4 of the type which is adapted to be controlled by a signal corresponding to the degree of depression of an accelerator pedal 6 connected with the fuel injection pump 3. The rotational output from an output shaft 2a of the diesel engine 2 is transmitted to an input shaft 4a of the torque converter 4 and a drive shaft 3a of the fuel injection pump 3. A control lever 5 of the fuel injection pump 3 is connected to the accelerator pedal 6 through a link mechanism (not illustrated), so that fuel is supplied to the diesel engine 2 from the fuel injection pump 3 through an injection pipe 7 in an amount corresponding to the degree of depression of the accelerator pedal 6.

To obtain a signal for controlling the torque converter 4 on the basis of the actual operating condition of the internal combustion engine irrespective of the actual degree of depression of the accelerator pedal 6, the fuel injection apparatus 1 is provided with a rotational speed sensor 8 for detecting the rotational speed of the diesel engine 2 and a position sensor 9 for detecting the position of a control sleeve 12 (refer to FIG. 2) provided within the fuel injection pump 3.

Figure 2:
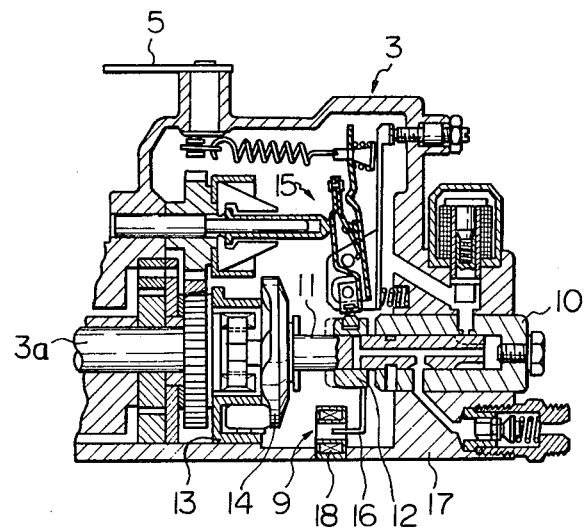
FIG. 2 is an enlarged, detailed sectional view of a principal portion of the fuel injection apparatus illustrated in FIG. 1.

As illustrated in detail in FIG. 2, the fuel injection pump 3 is a conventional distributing type fuel injection pump which comprises a barrel 10 provided at the head portion thereof, a plunger 11 fitted in the barrel 10, and the control sleeve 12 fitted around the plunger 11. Rotational movement of the drive shaft 3a is converted into a rotatingly reciprocating movement of the plunger 11 by a roller holder 13 and a cam disc 14. The control sleeve 12, which is the member for controlling the amount of fuel injected, is controlled by a mechanical governor 15 which utilizes a centrifugal force, with respect to a positional relationship with the plunger 11. The position of the control sleeve 12 is also controlled in accordance with the rotation angle of the control-lever 5. The position sensor 9 for detecting the position of the control sleeve 12 is a known type position sensor. It is comprised of a detecting rod 16 fixed to the control sleeve 12 and an electromagnetic coil 18 fixed to a casing 17. The detecting rod 16 is formed of a magnetic material and its free end is received within the electromagnetic coil 18 to a depth that varies with the positional change of the control sleeve 12.

Reverting to FIG. 1, a position signal $S_1$ produced by the position sensor 9 and a rotation signal $S_2$ produced by the speed sensor 8 are fed to a processing circuit 20. Data on the designed governor characteristics of the fuel injection pump 3 are stored in the processing circuit 20. In this embodiment, the relationship between the rotational speed N of the diesel engine 2 and the position P of the control sleeve 12 are stored as basic control data, with the degree of depression $\theta$ of the accelerator pedal 6 constituting a parameter in this relationship. The relationship expected from design parameters is shown graphically in FIG. 3. The processing circuit 20 uses the stored data on the designed governor characteristics and the position and rotation signals $S_1$ and $S_2$ indicating the actual operating conditions to determined the degree of depression of the accelerator pedal, which, according to design specifications, corresponds to the actual operating condition. On the basis of this determination, the processing circuit 20 produces a signal $S_3$ which is applied to the torque converter 4 as a control signal.

According to this system, since the signal $S_3$ indicative of the theoretical degree of depression of the accelerator pedal 6 applied to the torque converter 4 is determined by taking into consideration the designed characteristic curve and the actual operating condition of the fuel injection device, the torque converter can be operated at optimum condition, even if the relationship between the actual degree of depression of the accelerator pedal and the actual rotational speed of the engine are not in the relationship that they are intended to be in accord with the design specifications.

Figure 3:
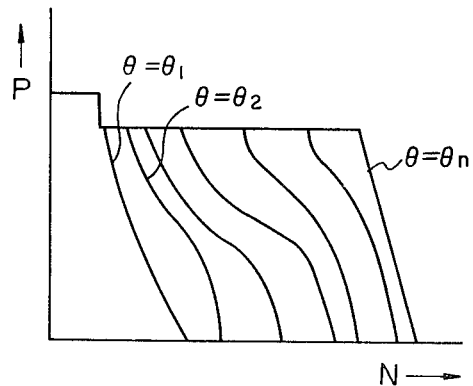
FIG. 3 is a graph showing the governor characteristic curves which the fuel injection apparatus is designed to have; and, FIG. 4 is a block diagram of an electronic circuit for the control system of the diesel engine apparatus illustrated in FIG. 1.
Figure 4:
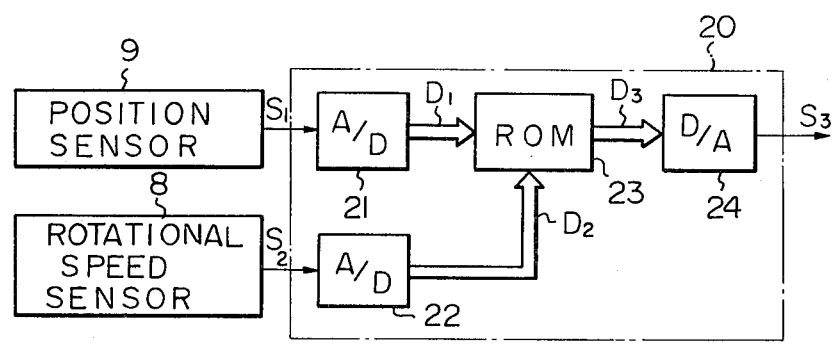

FIG. 4 illustrates a block diagram of an electronic system for the fuel injection apparatus illustrated in FIG. 1. The processing circuit 20 includes A/D converters 21 and 22 for converting the analog signals $S_1$ which changes in magnitude in accordance with fuel injection amount and $S_2$ which changes in magnitude in accordance with rotational speed of the engine into corresponding binary digital signals $D_1$ and $D_2$, respectively. These digital signals $D_1$ and $D_2$ are sent to a read-only memory (ROM) 23 and serve as address selection data. The information concerning the design characteristic curves shown in FIG. 3 is stored in the ROM 23 in the form of binary data in such a manner that the data on accelerator depression degree corresponding to the signals $D_1$ and $D_2$ is stored at the address accessed by signals $D_1$ and $D_2$. Since the signal $D_1$ indicates the position of the control sleeve and the signal $D_2$ indicates the rotational speed of the diesel engine, the degree of depression of the accelerator pedal, which, according to the design specifications, corresponds to the detected conditions of engine operation on the characteristic curves of FIG. 3, can be read out from ROM 23 by applying thereto as address data the signals $D_1$ and $D_2$ based on the signals from the sensors 9 and 8. This digital signal $D_3$ is converted by a D/A converter 24 into the control signal $S_3$ in an analog form and applied to the torque converter 4.

Although a ROM is employed in the circuit of FIG. 4, the present invention is not limited to such a circuit structure and may use other circuit structures. For instance, the processing circuit 20 of FIG. 1 may be an analog function generator to which the signals $S_1$ and $S_2$ are applied as input data and the analog acceleration signal $S_3$ indicative of the degree of the determined degree of accelerator pedal depression can be produced in accordance with the characteristic curves shown in FIG. 3.

In addition, although a distributing type fuel injection pump is employed in the embodiment as illustrated, the present invention is applicable to any type of fuel injection pump.

What is claimed is:

1. In a fuel injection apparatus for feeding fuel to an engine in response to control data determined by the operation of an operating member, comprising:
    means for producing a position signal in accordance with the position of an element controlling the amount of fuel injected;
    means for generating a rotational speed signal indicating the rotational speed of said engine; and
    means for determining an operating signal indicative of the value of said control data corresponding to the actual performance of the fuel injection apparatus so that a reliable operating signal for controlling other apparatus may be obtained, the determination being made on the basis of said position signal, said rotational speed signal and design data of said fuel injection apparatus.

2. A fuel injection apparatus according to claim 1, wherein said operating member is an accelerator pedal and said operating signal corresponds to the theoretical degree of depression of the accelerator pedal expected from said position signal, said rotational speed signal and said design data.

3. A fuel injecting apparatus according to claim 1, wherein the determining means includes at least one converter for converting said position signal and said rotational speed signal into binary digital signals and a digital memory unit storing said design data therein and adapted to receive the converted position signal and rotational speed signal as an address signal and to produce the control data determined by said position signal and said rotational speed signal.

4. A fuel injection apparatus according to claim 3, wherein said operating member is an accelerator pedal and said operating signal corresponds to the theoretical degree of depression of the accelerator pedal expected from said position signal, said rotational speed signal and said design data.

5. A fuel injection apparatus according to claim 1, wherein said design data is data indicating the relationship between the position of the element and the rotational speed with the degree of depression of the operating member constituting a parameter in this relationship.

6. A fuel injection apparatus according to claim 1, said other apparatus including a torque converter connected to the output of said engine.

7. A fuel injection apparatus for feeding fuel to a diesel engine equipped with a torque converter controllable according to the amount of accelerator operation, comprising:

means for producing a position signal indicating the position of an element for controlling the fuel injection amount provided within said fuel injecting apparatus;

means for producing a rotational speed signal indicating the rotational speed of the diesel engine;

means for determining the theoretical degree of depression of the accelerator according to the design specifications by using said position signal and said rotational speed signal on the basis of design data indicating the relationship between the position of said controlling element and the rotational speed, and;

means for applying a signal output from determining means to said torque converter.

* * * * *